United States Patent
Hihn et al.

(10) Patent No.: US 6,800,138 B2
(45) Date of Patent: Oct. 5, 2004

(54) INSTALLATION FOR COATING OBJECTS WITH A POWDER

(75) Inventors: Erwin Hihn, Walddorfhäslach (DE); Jan Reichler, Constance (DE)

(73) Assignee: Eisenmann Maschinenbau KG (DE)

( * ) Notice: Subject to any disclaimer, the term of this patent is extended or adjusted under 35 U.S.C. 154(b) by 0 days.

(21) Appl. No.: 10/379,412

(22) Filed: Mar. 4, 2003

(65) Prior Publication Data

US 2003/0209195 A1 Nov. 13, 2003

(30) Foreign Application Priority Data

Mar. 5, 2002 (DE) .......................................... 102 09 488

(51) Int. Cl.$^7$ .............................. B05B 7/14; B05B 5/12; B05B 15/04; B05C 15/00
(52) U.S. Cl. ........................ 118/312; 118/308; 118/309; 118/326; 454/50
(58) Field of Search ................................. 118/308, 309, 118/326, 312; 454/50; 55/DIG. 46

(56) References Cited

U.S. PATENT DOCUMENTS

| | | | | |
|---|---|---|---|---|
| 1,558,580 A | * | 10/1925 | Bishop | 141/69 |
| 3,616,904 A | * | 11/1971 | Aremaa | 209/262 |
| 5,743,958 A | * | 4/1998 | Shutic | 118/308 |
| 5,906,294 A | * | 5/1999 | Ikeya et al. | 222/55 |

\* cited by examiner

*Primary Examiner*—J. A. Lorengo
*Assistant Examiner*—Yewebdar T. Tadesse
(74) *Attorney, Agent, or Firm*—Factor & Lake

(57) ABSTRACT

An installation for coating objects with a powder, in particular for powder painting, comprises a booth, in which powder can be applied to the objects, a recovery device for the excess powder, which does not adhere to the objects during coating, a storage container for fresh powder and a mixing container, which can be supplied with excess powder from the recovery device and fresh powder from the storage container. A screening machine is arranged in the immediate vicinity of the mixing container, preferably directly beneath the latter, and serves at the same time as an application container, in which mixed powder can be temporarily stored for removal by the application device. The screening machine is not subjected to any low-frequency vibrations, so that a weighing device, which continuously measures the weight of the screening machine, measures the instantaneous consumption of mixed powder in real time. From the stored data, an unambiguous correlation between the quantity of powder dispensed at a particular point in time and the object coated at the point in time in question is possible, so that in the event of faults in the coating operation any defective objects can be determined.

2 Claims, 1 Drawing Sheet

INSTALLATION FOR COATING OBJECTS WITH A POWDER

BACKGROUND OF THE INVENTION

The invention relates to an installation for coating objects with a powder, in particular for powder painting, having a) a booth, in which powder can be applied to the objects by at least one application device;

b) a recovery device for the excess powder, which does not adhere to the objects during coating;

c) a storage container for fresh powder;

d) a mixing container, which can be supplied with excess powder from the recovery device and fresh powder from the storage container;

e) a screening machine, which can be supplied with mixed powder via an outlet valve of the mixing container;

f) an application container, in which screened mixed powder can be temporarily stored for removal by the application device, and g) a weighing device, which measures the weight of the application container.

It is known that when coating objects with powder there is a considerable amount of excess powder (so-called "overspray"), which does not adhere to the objects to be coated and for cost reasons must be recovered. This recovered excess powder is mixed in a particular ratio with fresh powder in a mixing container, after which it is screened in a screening machine and generally supplied to an application container, from which the application device then removes the powder which it has dispensed.

In an installation of the type mentioned at the outset which is known from the market, the application container is situated very close to the application device and is connected to the screening machine via a relatively long line. The application container is subjected to relatively low-frequency vibrations in order to keep the mixed powder situated therein flowable even in the vicinity of the walls. The weight of the application device is monitored with the aid of a weighing device and the supply of mixed powder from the screening machine is initiated when the filling weight of the application container falls below a particular value. This weighing device operates sluggishly for two reasons: on the one hand, the electronics have to be provided with a time constant which is long compared with the period of the vibrations to which the application container is subjected; on the other hand, the refilling of the application container takes a relatively long time owing to the long connection path to the screening machine and cannot be performed reliably and completely within the relatively short time lying between two coating operations. For this reason, it is not possible either to use the weight or change in weight of the application container, determined by the weighing device, as a reliable measure of the quantity of powder instantaneously dispensed per unit of time.

The object of the present invention is to design an installation of the type mentioned at the outset in such a way that the quantity of powder dispensed by the application device for each object to be painted can be unambiguously measured and documented, continuously in real time.

This object is achieved according to the invention in that the screening machine h) is arranged in the immediate vicinity of the mixing container;

i) serves at the same time as the application container;

k) is not subjected to any low-frequency vibrations;

l) is provided with a controllable outlet valve.

SUMMARY OF THE INVENTION

The invention is based on the realisation that, in order to utilise the output signal of the weighing device as a real-time measure of the instantaneously dispensed quantity of powder, various conditions must be fulfilled: firstly, the conveying path between the outlet valve, which controls the charging of the application container, and the application container itself, whose weight is to be monitored, must not be too long, as this would make control of the refilling operation overall too sluggish. Consequently, the present invention uses the screening machine, which is arranged directly by the mixing container, at the same time as the application container. In this way, the time which the mixed powder takes to travel from the mixing container to the application container is shortened to a negligible amount and at the same time the outlay on apparatus is reduced. Secondly, the screening machine must be provided with a controllable outlet valve, in order to allow a defined quantity of mixed powder, sufficient for the complete coating of at least one object, to be weighed into the screening machine at the start of the coating operation. Thirdly, the screening machine must not vibrate at such a low frequency that, in order to process the electrical weighing signal, time constants are required which are comparable with the times which the mixed powder takes to cover the distance to the application device., in particular on no account comparable with the cycle times of the coating operation in the corresponding booth.

If these conditions are fulfilled, it is possible to correlate the change of the screening machine in time directly with the quantity of powder removed per unit of time. Since these measurement results are obtained in real time, it is continuously known which object has had the measured quantity of mixed powder applied to it. Faults in the coating operation, which are determined directly during this operation or else in the subsequent evaluation of stored data, can be unambiguously assigned to a particular object, which can then be segregated as being defectively coated, and optionally refinished.

It is particularly advantageous for the screening machine to be arranged directly beneath the mixing container and the mixing container to have a discharge pipe, via which, after opening the outlet valve of the mixing container, the mixed powder passes in free fall into the screening machine. In this way, the charging of the screening machine is accomplished in a particularly trouble-free and quick manner, so that it is possible, even in the case of rapid cycle times of the coating operation, for the screening machine serving as the application container to be filled between two coating operations. In addition, given that the screening machine is charged in free fall, no secondary air and no additional energy are introduced into the screening machine, which, as experience shows, would otherwise lead to deposits on the screening material.

BRIEF DESCRIPTION OF THE DRAWING

An exemplary embodiment of the invention is explained in more detail below with reference to the drawing.

DETAILED DESCRIPTION OF THE DRAWING

Figure 1:
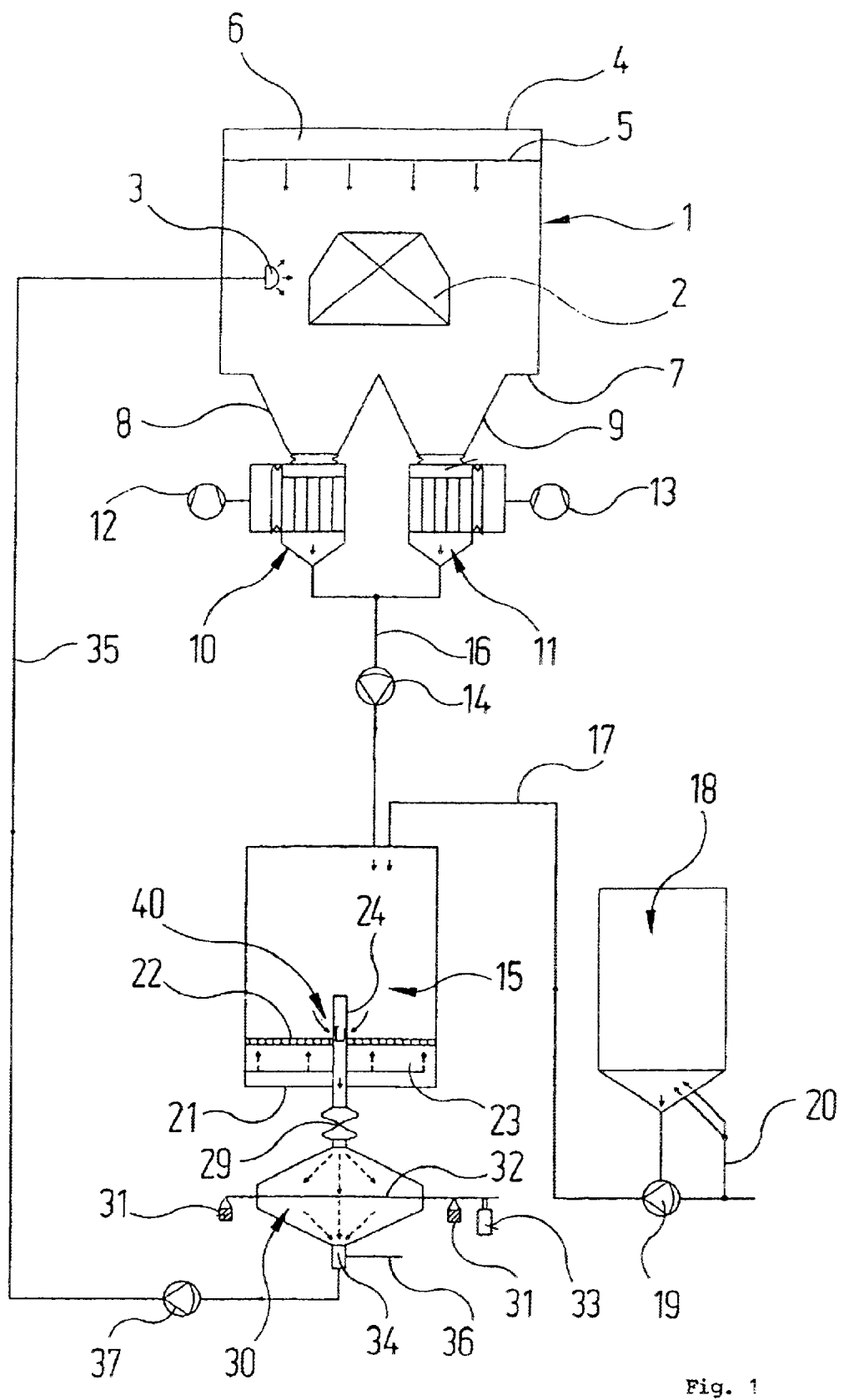
FIG. 1 Schematically shows an installation for powder painting.

In the drawing, the reference numeral 1 denotes the housing of a powder painting booth, into which housing objects 2 to be coated with powder paint are brought successively at particular cycle times. Painting powder is applied to the objects 2 by an application device 3 and the objects are then cyclically removed from the powder painting booth 1 again.

Between the upper side 4 of the powder painting booth 1 and a suspended filter ceiling 5 there is formed an air plenum 6 which is fed with supply air via an inlet opening (not illustrated in the drawing). Air exits from the air plenum 6 and moves downwards in the direction of the arrows marked on the drawing into the interior of the powder painting booth 1. This air entrains excess powder, which has not been deposited on the objects 2, for recovery. For this purpose, the air/powder mixture enters two extraction funnels 8, 9 which are provided in the bottom 7 of the powder painting booth 1 and via which it is guided to two filter units 10, 11. In these filter units 10, 11, the air is separated from the powder, extracted with the aid of fans 12, 13 and passed on either to a preparation device for recycling in the powder painting booth 1 or to the outside atmosphere.

The powder remaining in the filter units 10, 11 is supplied via a line 16 with the aid of a pump 14 to a mixing container 15. Via a further line 17, fresh painting powder is additionally introduced into the mixing container 15. This fresh powder is withdrawn from a storage container 18 with the aid of a pump 19. The fresh powder in the storage container 18 is fluidised with the aid of compressed air which can flow into the storage container 18 via a line 20. Compressed air is also supplied to the pump 19, so that in actual fact an air/fresh powder mixture is conveyed in the line 17 by the pump 19.

The mixing container 15 has a fluidising floor 22 made of porous material at a certain distance above its bottom 21. This results in an air plenum 23 between the bottom 21 of the mixing container 15 and the fluidising floor 22, into which air plenum compressed air is introduced via a line 24'. The air penetrating through the fluidising floor 22 into the interior of the mixing container 15 lying thereabove keeps the mixture of old and fresh powder therein fluidised and thus flowable.

The bottom 21 of the mixing container 15 is penetrated by a discharge pipe 24, just like the fluidising floor 22. Just above the fluidising floor 22, the discharge pipe 24 has in its circumferential surface a discharge valve 40 (not illustrated specifically in the drawing), via which, in the open state, the fluidised powder can pass into the discharge pipe 24 under the influence of gravity.

The discharge pipe 24 leads, by a short path in which an expansion joint 29 is located, directly to a screening machine bearing the reference numeral 30. The screening machine 30 rests, as a whole, on a plurality of electrical weighing cells 31, so that the weight of the screening machine 30 together with the powder contents can be continuously determined with the aid of the weighing cells 31. The screening cloth 32 of the screening machine 30 is subjected to the action of an ultrasonic generator 33. The screening machine 30 is stationary as a whole, that is to say is in particular not caused to vibrate (except for high-frequency ultrasonic vibrations which are optionally transmitted to the entire screening machine 30).

At the lower outlet end of the screening machine 30 there is a controllable outlet valve 34, from which a line 35 leads to the application device 3 inside the powder painting booth 1. Compressed air is additionally fed into the line 35 via a line 36. A pump 37 located in the line 35 thus conveys a powder/air mixture.

The above-described powder painting installation works as follows:

Before the coating of an object 2 in the powder painting booth 1 begins, the discharge valve 40 of the receiving container 15 is firstly opened, the outlet valve 34 of the screening machine 30 being closed. While observing the weight of the screening machine 30, which is continuously determined by the weighing cells 31, a quantity of mixed powder which is sufficient at least for completely painting the object 2 currently situated in the powder booth 1, or a plurality of such objects 2, is removed from the receiving container 15 and introduced in free fall into the screening machine 30 through the discharge pipe 24. The screening machine 30 in this case also performs the function of a conventional application container. The discharge valve 40 of the receiving container 15 is then closed again and the powder situated in the screening machine 30 is screened.

The coating operation can now begin. For this purpose, the outlet valve 34 of the screening machine 30 is opened and the screened mixed powder is supplied to the application device 3 with the aid of the pump 37. The weight reduction of the screening machine 30, which is caused by the loss of screened mixed powder, is continuously monitored with the aid of the weighing cells 31. The data are stored in real time.

The powder dispensed by the application device 3 is partly deposited on the object 2 and partly entrained by the air stream present in the powder painting booth 1 and is sucked into the filter units 10, 11 via the extraction funnels 8, 9. The powder separated off there is re-introduced via the line 16 with the aid of the pump 14 into the mixing container 15, which is additionally supplied with fresh powder in an appropriate ratio from the storage container 18 via the line 17 with the aid of the pump 19.

By continuously observing the quantity of powder which is delivered via the application device 3 to the objects 2 in the powder painting booth 1 and by storing these data obtained in real time, it is possible at all times to check whether a sufficient quantity of powder has been applied to the individual objects 2. Any deviations from the desired values which are found can be unambiguously assigned to a particular painted object 2. Even while the application device 3 is in operation, an alarm can be sounded if the total weight of the screening machine 30 does not change in the prescribed manner, that is to say the required quantity of powder per unit of time is not withdrawn from this screening machine 30. In this way, complete documentation of the painting operation for successive objects 2 and, where appropriate, unambiguous identification of defectively painted objects 2, as well as fault location within the painting installation, are possible.

What is claimed is:

1. Installation for coating objects with a powder, in particular for powder painting, having
    a) a booth, in which powder can be applied to the objects by at least one application device;
    b) a recovery device for excess powder which does not adhere to the objects during coating;
    c) a storage container for fresh powder;
    d) a mixing container, which can be supplied with excess powder from the recovery device and fresh powder from the storage container;
    e) a screening machine, which can be supplied with mixed powder via an outlet valve of the mixing container;
    f) an application container, in which screened mixed powder can be temporarily stored for removal by the application device; and g) a weighing device, which measures the weight of the application container, characterised in that the screening machine h) is arranged in the immediate vicinity of the mixing container;

i) serves at the same time as the application container;

k) is not subjected to any low-frequency vibrations, and l) is provided with a controllable outlet valve.

2. An installation according to claim 1, characterised in that the screening machine is arranged directly beneath the mixing container and the mixing container has a discharge pipe, via which, after opening the outlet valve of the mixing container, the mixed powder passes in free fall into the screening machine.

* * * * *